(12) United States Patent
Hu et al.

(10) Patent No.: US 11,822,127 B2
(45) Date of Patent: Nov. 21, 2023

(54) OPTICAL FIBER FILTER WITH ULTRA-WIDE TUNING RANGE

(71) Applicant: II-VI Delaware, Inc., Wilmington, DE (US)

(72) Inventors: Yongkang Hu, Fuzhou (CN); Ketang Tan, Fuzhou (CN)

(73) Assignee: II-VI DELAWARE, INC., Wilmington, DE (US)

( * ) Notice: Subject to any disclaimer, the term of this patent is extended or adjusted under 35 U.S.C. 154(b) by 0 days.

(21) Appl. No.: 17/456,050

(22) Filed: Nov. 22, 2021

(65) Prior Publication Data

US 2022/0196916 A1  Jun. 23, 2022

(30) Foreign Application Priority Data

Dec. 18, 2020 (CN) .......................... 202011513667.3

(51) Int. Cl.
*G02B 6/293* (2006.01)
(52) U.S. Cl.
CPC ..... *G02B 6/29395* (2013.01); *G02B 6/29304* (2013.01); *G02B 6/29361* (2013.01); *G02B 6/29389* (2013.01)

(58) Field of Classification Search
None
See application file for complete search history.

(56) References Cited

U.S. PATENT DOCUMENTS

| | | | |
|---|---|---|---|
| 7,352,783 B2* | 4/2008 | Chong | H01S 3/0675 372/100 |
| 9,720,250 B1* | 8/2017 | Birman | G02B 27/4244 |
| 2012/0257279 A1* | 10/2012 | Hsieh | G02B 26/105 359/572 |
| 2015/0346480 A1* | 12/2015 | Chen | G02B 26/0833 359/226.1 |

* cited by examiner

*Primary Examiner* — Omar R Rojas
(74) *Attorney, Agent, or Firm* — Blank Rome LLP

(57) ABSTRACT

An optical fiber filter has an ultra-wide tuning range and includes a two-dimensional mechanical rotating mirror, a collimating and beam expanding system, and two grating. An input fiber emits a multi-wavelength optical signal into the rotating mirror, which reflects the signal to the system to form collimated beams. In turn, the collimated beams are incident on the gratings that disperse the light of different wavelengths to different angles. Lights of different diffraction angles are input into an output fiber by adjusting the rotating mirror. The rotating mirror can be used to switch between gratings of different wavebands to tune optical wavelengths in an ultra-wide range.

18 Claims, 4 Drawing Sheets

OPTICAL FIBER FILTER WITH ULTRA-WIDE TUNING RANGE

CROSS-REFERENCE TO RELATED APPLICATIONS

This application claims priority to Chinese Application No. 202011513667.3, filed Dec. 18, 2020, the entire contents of which are hereby incorporated by reference herein.

FIELD

The present disclosure is directed to the field of optical fiber communications and optical fiber sensing, and more particularly, to an optical fiber filter with an ultra-wide tuning range.

BACKGROUND

Dense Wavelength Division Multiplexing (DWDM) optical fiber communication plays a dominate role in long-distance and large-capacity communications. With the explosive growth of network services, DWDM transmission channels are extending from the traditional 80 or 96 channels to 120 channels and are even being expanded to L band. An optical channel performance monitor is an indispensable device for monitoring system health in a DWDM optical communication system. A tunable optical fiber filter is the core optical engine of the optical channel performance monitor.

The working wavelength range to be monitored requires a corresponding extension for tuning. At present, the tuning range for the wavelength of mainstream tunable optical fiber filters on the market is 40 to 50 nm. A single independent device cannot meet the ultra-wide C+L tuning range, and two independent devices have to be used to complete the tuning or scanning of the C or L band, respectively. The disadvantage of this method is high cost and large volume.

SUMMARY OF THE DISCLOSURE

To solve deficiencies in the prior art, the present disclosure provides an optical fiber filter with an ultra-wide tuning range. The optical fiber filter has low cost, a simple structure, stable performance, and high reliability. The optical fiber filter can be used with an optical channel monitor in a DWDM optical communication system and can realize a C+L ultra-wide tuning range.

In order to realize the above objective, the following technical solutions are used in the present disclosure.

The optical fiber filter with the ultra-wide tuning range includes a two-dimensional mechanical rotating mirror, a collimating and beam expanding system, and two gratings. At an input of the filter, an input optical fiber emits a multi-wavelength optical signal to the two-dimensional mechanical rotating mirror. The optical signal is reflected to the collimating and beam expanding system to form collimated beams. The collimated beams are incident on the gratings that generate dispersion to scatter different wavelengths at different angles. Light at the different diffraction angles is ultimately input into an output optical fiber for output of the filter by the adjustment of the two-dimensional mechanical rotating mirror.

In one arrangement, the optical fiber filter uses a dual optical fiber structure having an optical fiber circulator with the input optical fiber and the output optical fiber. In this arrangement, the optical fiber filter includes first total reflection components correspondingly arranged on front ends of the two gratings, and includes second total reflection components correspondingly arranged on rear ends of the two gratings. Collimated beams from the collimating and beam expanding system are reflected by the first total reflection components and enter into the respective gratings, which disperse the beams to the second total reflection components. Reflected wavelengths pass through the respective gratings and return to the optical fiber circulator along a retracing path for output from the output optical fiber.

In another configuration, the input optical fiber and the output optical fiber can be two independent components, and there can be two output optical fibers. In this other arrangement, the optical fiber filter includes first total reflection components correspondingly arranged on front ends of the two gratings, and groups of lenses are correspondingly arranged on rear ends of the two gratings. The two output optical fibers are arranged correspondingly to the two groups of lenses, and optical signals from the gratings are coupled into corresponding output optical fibers via the groups of lenses.

In the configurations, the gratings can be a multilevel cascade structure of a transmissive grating, a reflective grating, or a group of the two.

In the configurations, movement of the two-dimensional mechanical rotating mirror in a first dimension can be used for wavelength tuning, and movement in a second dimension can be used to expand the wavelength tuning range to make it switchable between C-band and L-band gratings to achieve an ultra-wide tuning range in the entire C+L bands. The two-dimensional mechanical rotating mirror can also adjust the power of the output optical signal.

The above technical solutions are used in the present disclosure, and have the following beneficial effects: a two-dimensional mechanical rotating mirror is used to switch between gratings of different wavebands, which can realize tuning of optical wavelengths in an ultra-wide range. The application scenarios are greatly expanded, the cost is reduced, and the optical path is simple, which can realize fast tuning. In addition, the number of channels can be expanded by multiplexing the time and the position of the two-dimensional mechanical rotating mirror.

BRIEF DESCRIPTION OF THE DRAWINGS

The present disclosure will be further described in detail below in conjunction with the drawings and specific embodiments.

DETAILED DESCRIPTION

Figure 1:
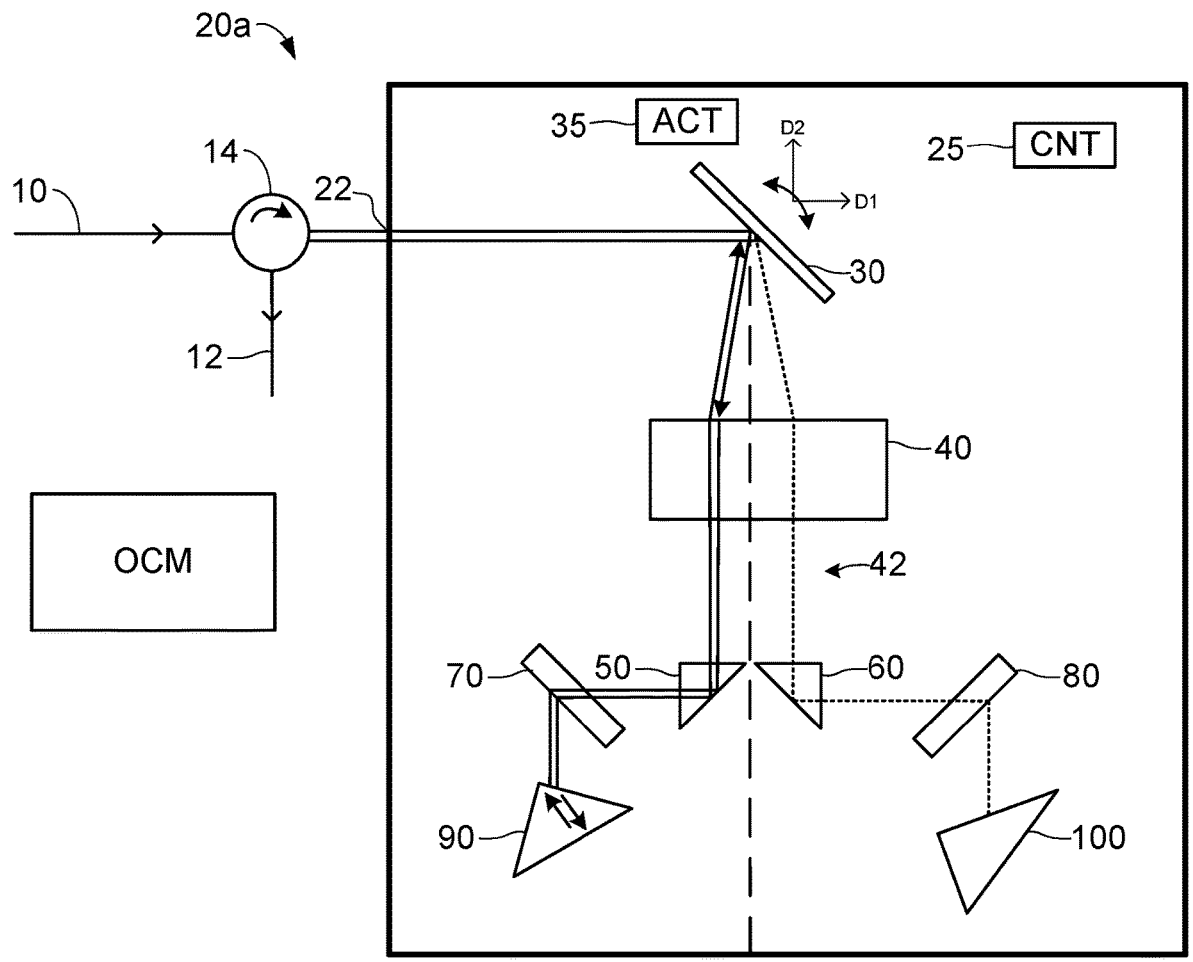
FIG. 1 is a schematic diagram of an optical fiber filter according to a first embodiment of the present disclosure.

As shown in FIGS. 1-4, an optical fiber filter 20a-d with an ultra-wide tuning range can be used with an optical channel monitor (OCM), such as used to monitor channels in a DWDM optical communication system. The optical fiber filer 20a-d has an input (used with one or more input optical fibers 10) and has an output (used with one or more output optical fiber 12) that communicate with the optical channel monitor and/or other elements of the DWDM optical communication system. The optical fiber filter 20a-d includes a two-dimensional mechanical rotating mirror or other controllable reflector 30, a collimating and beam expanding system 40, and two diffraction gratings 70 and 80. The one or more input optical fibers 10 emit one or more multi-wavelength optical signals to the two-dimensional mechanical rotating mirror 30, which has an actuator 32 to position the mirror 30 in two dimensions. Control circuitry 25 of the optical fiber filter 20 can operate the actuator 35 to position the mirror 30. For example, the control circuitry 25 can multiplex the time and the position of the two-dimensional mechanical rotating mirror 30 to provide wavelengths for optical channel monitoring.

The mirror 30 reflects the multi-wavelength optical signal(s) to the collimating and beam expanding system 40 to form collimated beams depending on the orientation of the mirror 30. In turn, the collimated beams 42 are incident on the grating 70 and 80, which disperse the different wavelengths of the beams at different angles. In turn, light at the different diffraction angles is input into the output optical fiber 12 based on the orientation of the two-dimensional mechanical rotating mirror 30.

A first embodiment of the optical fiber filter 20a is shown in FIG. 1 and is used with a dual optical fiber structure having an input optical fiber 10, an output optical fiber 12, and an optical fiber circulator 14. The input and output optical fibers 10, 12 connect to the optical fiber circulator 14, which connects to an input-output 22 of the device 20a. First total reflection components 50 and 60 are correspondingly arranged on the front ends of the two gratings 70 and 80, and second total reflection components 90 and 100 are correspondingly arranged on the rear ends of the two gratings 70 and 80. Depending on the orientation of the mirror 30, a selected one of the collimated beams 42 from the collimating and beam expanding system 40 is reflected by the first total reflection component 50 or 60 and enters into the grating 70 or 80. The optical signal from the grating 70 or 80 incident on the second total reflection component 90 or 100 returns to the grating 70 or 80 and passes to the optical fiber circulator 14 along a retracing path for output from the output optical fiber 12.

The first total reflection components 50 and 60 and the second total reflection components 90 and 100 may be total reflection mirrors or total reflection prisms.

The working principle for this first embodiment of the optical fiber filter 20a is as follows. A multi-wavelength optical signal input by the input optical fiber 10 is incident on the two-dimensional mechanical rotating mirror 30, which can be adjusted and set in two dimensions (D1, D2). One dimension (D1) can set which wavelength is selected, and the other dimension (D2) can set which range or band (e.g., associated with the grating 70 or 80) is selected. The optical signal is reflected to the collimating and beam expanding system 40 and is incident on a plane of the respective grating 70 or 80 via the respective first total reflection components 50 or 60. The grating 70 or 80 generates dispersion where different wavelengths at different angles are directed to the respective second total reflection components 90 or 100. Only the wavelength that satisfies the Littrow condition obtains the maximum diffraction efficiency. This wavelength is thereby reflected back to the optical fiber circulator 14 through the corresponding total reflection component 50, 60, the system 40, the mirror 30, and the circulator 14 to be output through output optical fiber 12. In this way, the input light passes through the grating 70 or 80 twice, and the bandwidth of the input spectrum is effectively compressed.

As the two-dimensional mechanical rotating mirror 30 is rotated in the first dimension (D1), different rotation angles will have corresponding different wavelengths that meet the Littrow condition and are reflected to the collimating and beam expanding system 40 so the optical fiber filter 20a can achieve the purposes of tuning. The respective grating 70 or 80 is selected by adjusting the second rotation dimension (D2) of the two-dimensional mechanical rotating mirror 30 for setting at different angles. If the two gratings 70 and 80 are set to different wavelength ranges (e.g., C band and L-band), the tuning range of the filter 20a can be expanded, thereby achieving an ultra-wide tuning range in the C+L band. In addition, the power of the output optical signal can be adjusted at the same time by rotating the two-dimensional mechanical rotating mirror 30.

Figure 2:
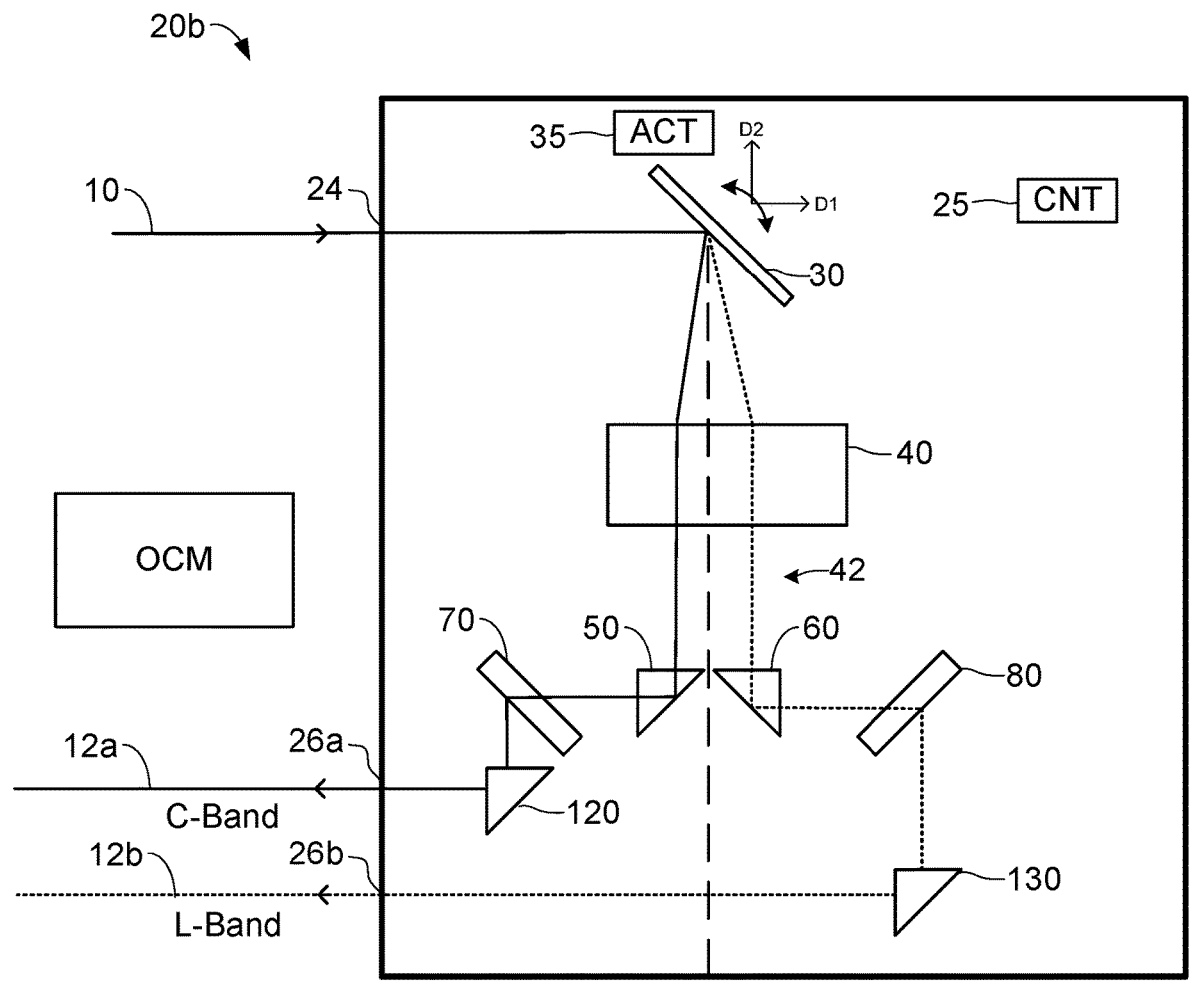
FIG. 2 is a schematic diagram of an optical fiber filter according to a second embodiment of the present disclosure.

A second embodiment of the optical fiber filter 20b is shown in FIG. 2 and has similarities to the first embodiment of FIG. 1. Like reference numerals are used for similar components so their descriptions are not repeated. Here, second total reflection components (90, 100) and an optical fiber circulator (14) from the first embodiment are not used. Instead, the input optical fiber 10 and the output optical fiber 12a-b are independent components, and there are two output optical fibers 12a-b. The input fiber connects to an input 24 of the filter 20b, and the output optical fibers 12a-b connect to outputs 26a-b of the filter 20b. As before, the first total reflection components 50 or 60 are correspondingly arranged on the front ends of the two gratings 70 and 80. However, groups of lenses 120 or 130 or comparable components are correspondingly arranged on the rear ends of the two gratings 70 and 80. The two output optical fibers 12a-b are arranged corresponding to the two groups of lenses 120 or 130, and the optical signals from the gratings 70 or 80 are coupled into corresponding output optical fibers 12a-b via the groups of lenses 120 or 130, thereby achieving an ultra-wide tuning range in the C+L band.

Figure 3:
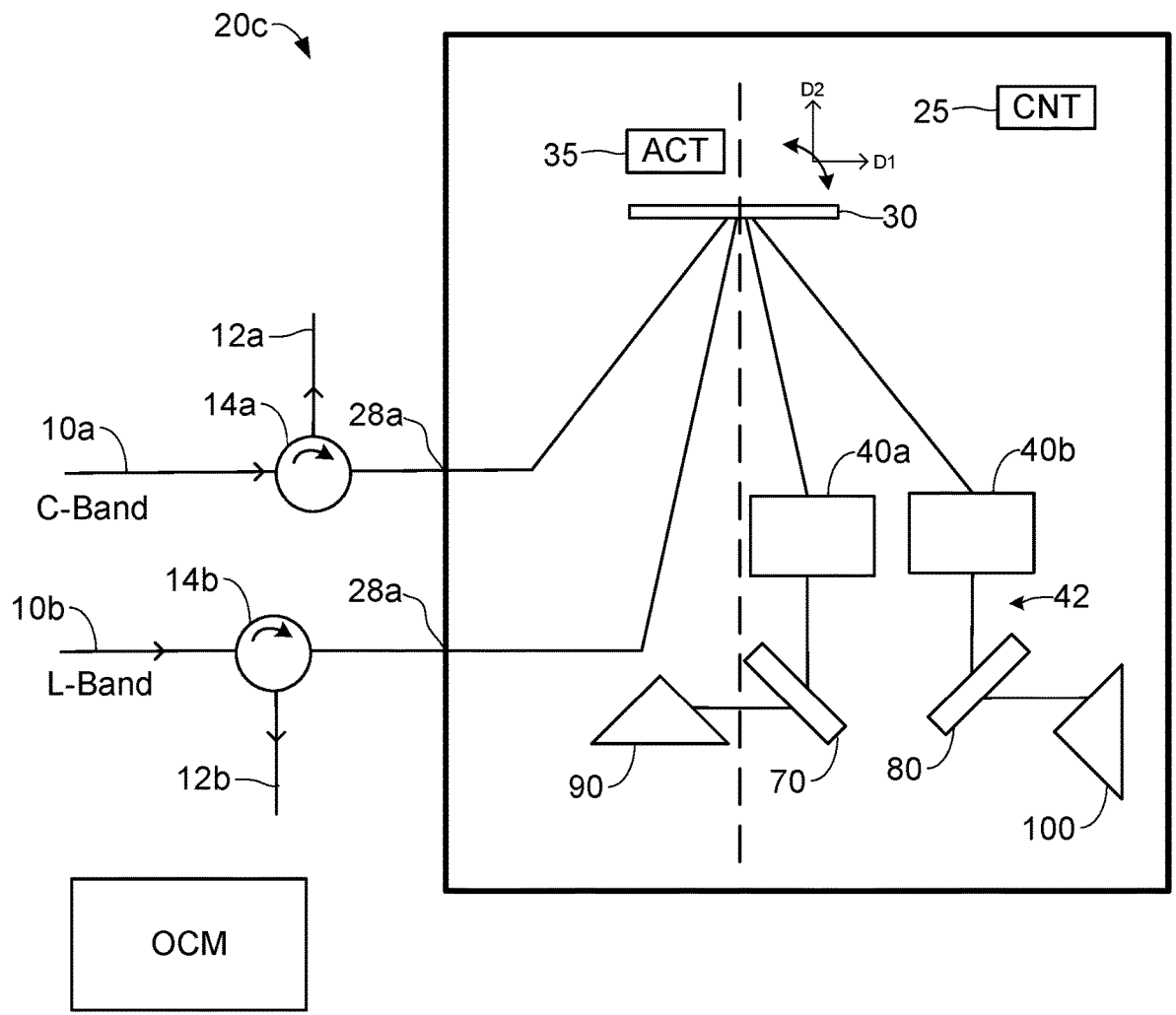
FIG. 3 is a schematic diagram of an optical fiber filter according to a third embodiment of the present disclosure.

A third embodiment of the optical fiber filter 20c shown in FIG. 3 is also similar to the first embodiment. Like reference numerals are used for similar components so their descriptions are not repeated. Here, dual optical fiber structures having input optical fibers 10a-b, output optical fibers 12a-b, and optical fiber circulator 14a-b are used. The input and output optical fibers 10a-b, 12a-b connect to the optical fiber circulators 14a-b, which connect to input-outputs 28a-b of the device 20c.

Optical signals of different wavelength ranges (e.g., C-band and L-band) can be incident on the two-dimensional mechanical rotating mirror 30 simultaneously via the optical fiber circulators 14a-b. When the two-dimensional mechanical rotating mirror 30 is rotated at a specific angle, the input light will directly return to the optical fiber circulators 14a-b for output to the output optical fiber 12a-b. Compared with the first embodiment, synchronous tuning of different bands (e.g., C-band and L-band) can be achieved in this embodiment of the optical fiber filter 20c.

Figure 4:
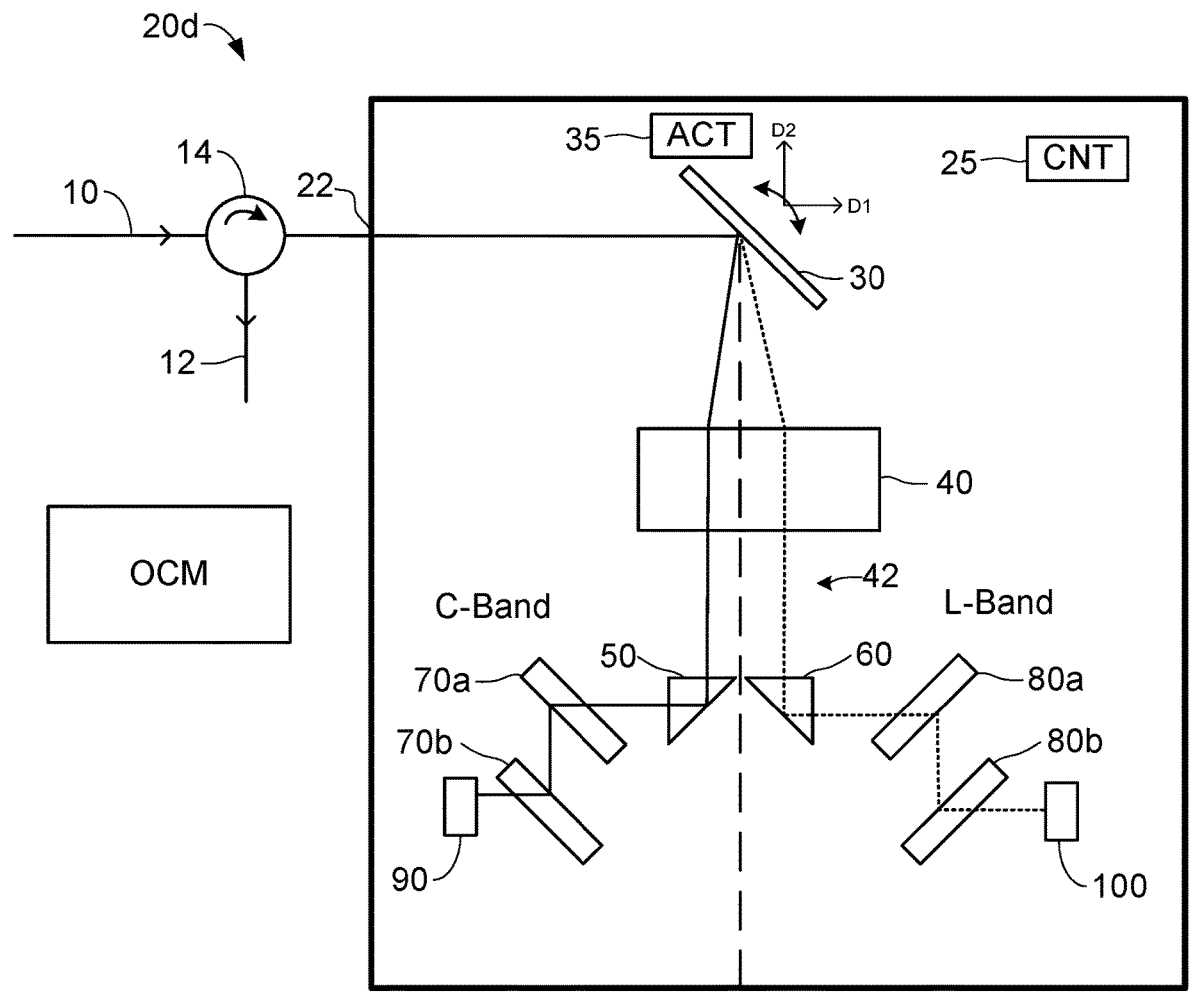
FIG. 4 is a schematic diagram of an optical fiber filter according to a fourth embodiment of the present disclosure.

A fourth embodiment of the optical fiber filter 20d shown in FIG. 4 is similar to the first and third embodiments of FIGS. 1 and 3. Like reference numerals are used for similar components so their descriptions are not repeated. The input and output optical fibers 10, 12 connect to the optical fiber circulator 14, which connects to the input-output 22 of the device 20d. In this filter 20d, the gratings 70a-b, 80a-b may use a multilevel cascade structure of transmissive gratings, reflective gratings, or a combination of transmissive gratings and reflective gratings.

The implementation of the present disclosure is described above with reference to the accompanying drawings, but the present disclosure is not limited to the above-mentioned specific embodiments. As will be appreciated, features from one of the embodiments disclosed herein can be component with features of the other embodiments. The above-mentioned specific embodiments are illustrative rather than limiting the present disclosure, and those of ordinary skill in the art should understand that: it is still possible to modify the technical solutions described in the foregoing embodiments, or equivalently replace some or all of the technical features. However, these modifications or replacements do not deviate the essence of the corresponding technical solutions from the scope of the technical solutions of the embodiments of the present disclosure, and they should all be covered in the scope of the claims and specification of the present disclosure.

What is claimed is:

1. An optical fiber filter to filter at least one multi-wavelength optical signal emitted from at least one input optical fiber for output to at least one output optical fiber, the optical fiber filter comprising:
    a two-dimensional mechanical rotating mirror disposed in optical communication with the at least one multi-wavelength optical signal, the two-dimensional mechanical rotating mirror being configured to rotate in two-dimensions and being configured to reflect the at least one multi-wavelength optical signal;
    a collimating and beam expanding system disposed in optical communication with the at least one reflected signal and being configured to form collimated beams therefrom; and
    two gratings each disposed in optical communication with a respective one of the collimated beams and being configured to disperse the respective collimated beam into light of different wavelengths at different diffraction angles,
    wherein the two-dimensional mechanical rotating mirror is configured to select the light of at least one of the different diffraction angles as at least one filtered signal for output to the at least one output optical fiber.

2. The optical fiber filter of claim 1, the at least one input optical fiber being a single input optical fiber, the at least one output optical fiber being a single output optical fiber, wherein the optical fiber filter comprises:
    an optical fiber circulator in communication with the single input optical fiber and the single output optical fiber;
    first total reflection components correspondingly arranged on front ends of the two gratings and being configured to reflect the respective collimated beams from the collimating and beam expanding system to the respective gratings; and
    second total reflection components correspondingly arranged on rear ends of the two gratings, each of the second total reflection components being configured to return the respective filtered signal meeting a Littrow condition along a retracing path to the optical fiber circulator for output from the single output optical fiber.

3. The optical fiber filter of claim 1, the input optical fiber and the at least one output optical fiber being two independent components, the at least one output optical fiber being two output optical fibers, wherein the optical fiber filter comprises:
    first total reflection components correspondingly arranged on front ends of the two gratings; and
    groups of lenses correspondingly arranged on rear ends of the two gratings, each of the groups disposed in communication with one of the two output optical fibers and being configured to couple the respective filtered signal from the respective grating into a respective one of the two output optical fibers.

4. The optical fiber filter of claim 1, wherein the gratings comprise a multi-level cascade structure of gratings selected from the group consisting of transmissive gratings, reflective gratings, or a combination of transmissive gratings and reflective gratings.

5. The optical fiber filter of claim 1, wherein a first dimension of the two-dimensional mechanical rotating mirror is configured to tune a wavelength for the filtered signal; and wherein a second dimension is configured to switch between the gratings to achieve an ultra-wide tuning range.

6. The optical fiber filter of claim 5, wherein the two gratings comprise a C-band grating and an L-band grating; and wherein the first dimension of the two-dimensional mechanical rotating mirror is configured to tune the wavelength for the filtered signal; and wherein a second dimension is configured to switch between the C-band and L-band gratings to achieve an ultra-wide tuning range in the entire C+L bands.

7. The optical fiber filter of claim 5, wherein the two-dimensional mechanical rotating mirror is configured to adjust power of the filtered signal.

8. An optical fiber filter to filter a multi-wavelength optical signal emitted from an input optical fiber for output to an output optical fiber, the optical fiber filter comprising:
    an optical fiber circulator in communication with the input optical fiber and the output optical fiber;
    a two-dimensional mechanical rotating mirror disposed in optical communication with the at least one multi-wavelength optical signal, the two-dimensional mechanical rotating mirror being configured to rotate in two-dimensions and being configured to reflect the multi-wavelength optical signal;
    a collimating and beam expanding system disposed in optical communication with the reflected signal and being configured to form collimated beams therefrom; and
    two gratings each disposed in optical communication with a respective one of the collimated beams and being configured to disperse the respective beam into light of different wavelengths at different diffraction angles;
    first total reflection components correspondingly arranged on front ends of the two gratings and being configured to reflect the respective collimated beams from the collimating and beam expanding system to the respective gratings; and
    second total reflection components correspondingly arranged on rear ends of the two gratings, each of the second total reflection components being configured to return a respective filtered signal meeting a Littrow condition along a retracing path to the optical fiber circulator for output from the single output optical fiber,
    wherein the two-dimensional mechanical rotating mirror is configured to select the light of at least one of the different diffraction angles as the respective filtered signal for output to the output optical fiber.

9. The optical fiber filter of claim 8, wherein the gratings comprise a multi-level cascade structure of gratings selected from the group consisting of transmissive gratings, reflective gratings, or a combination of transmissive gratings and reflective gratings.

10. The optical fiber filter of claim 8, wherein a first dimension of the two-dimensional mechanical rotating mirror is configured to tune a wavelength for the filtered signal; and wherein a second dimension is configured to switch between the gratings to achieve an ultra-wide tuning range.

11. The optical fiber filter of claim 10, wherein the two gratings comprise a C-band grating and an L-band grating; and wherein a first dimension of the two-dimensional mechanical rotating mirror is configured to tune a wavelength for the filtered signal; and wherein a second dimension is configured to switch between the C-band and L-band gratings to achieve the ultra-wide tuning range in the entire C+L bands.

12. The optical fiber filter of claim 10, wherein the two-dimensional mechanical rotating mirror is configured to adjust power of the filtered signal.

13. An optical fiber filter to filter first and second multi-wavelength optical signals emitted from first and second input optical fibers for output to first and second output optical fibers, the optical fiber filter comprising:
a first optical fiber circulator in communication with the first input optical fiber and the first output optical fiber;
a second optical fiber circulator in communication with the second input optical fiber and the second output optical fiber;
a two-dimensional mechanical rotating mirror disposed in optical communication with the first and second multi-wavelength optical signals, the two-dimensional mechanical rotating mirror being configured to rotate in two-dimensions and being configured to reflect the multi-wavelength optical signals;
a collimating and beam expanding system disposed in optical communication with the reflected signals and being configured to form collimated beams therefrom; and
two gratings each disposed in optical communication with a respective one of the collimated beams and being configured to disperse the respective beam into light of different wavelengths at different diffraction angles;
first total reflection components correspondingly arranged on front ends of the two gratings and being configured to reflect the respective collimated beams from the collimating and beam expanding system to the respective gratings; and
second total reflection components correspondingly arranged on rear ends of the two gratings, each of the second total reflection components being configured to return a respective filtered signal meeting a Littrow condition along a retracing path to the optical fiber circulator for output from the single output optical fiber,
wherein the two-dimensional mechanical rotating mirror is configured to select the light of the different diffraction angles simultaneously as the respective filtered signals for output to the output optical fibers.

14. The optical fiber filter of claim 13, wherein the gratings comprise a multi-level cascade structure of gratings selected from the group consisting of transmissive gratings, reflective gratings, or a combination of transmissive gratings and reflective gratings.

15. The optical fiber filter of claim 13, wherein a first dimension of the two-dimensional mechanical rotating mirror is configured to tune a wavelength for the filtered signals.

16. The optical fiber filter of claim 13, wherein the two gratings comprise a C-band grating and an L-band grating.

17. The optical fiber filter of claim 1, wherein the two-dimensional mechanical rotating mirror includes an actuator to position the two-dimensional mechanical mirror in two dimensions.

18. The optical fiber filter of claim 17, further comprising a control circuitry that operates the actuator to position the two-dimensional mechanical mirror.

* * * * *